(12) United States Patent
Deshpande

(10) Patent No.: US 7,047,308 B2
(45) Date of Patent: May 16, 2006

(54) SYSTEM AND METHOD FOR SIMULTANEOUS MEDIA PLAYOUT

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 814 days.

(21) Appl. No.: 09/944,012

(22) Filed: Aug. 31, 2001

(65) Prior Publication Data

US 2003/0061371 A1   Mar. 27, 2003

(51) Int. Cl.
*G06F 15/16*   (2006.01)

(52) U.S. Cl. .................. 709/232; 370/230; 370/236.1; 709/231; 709/233; 709/227

(58) Field of Classification Search ........ 709/219–233; 375/240; 370/468, 230–237, 351–257
See application file for complete search history.

(56) References Cited

U.S. PATENT DOCUMENTS

| | | | | |
|---|---|---|---|---|
| 5,566,208 | A * | 10/1996 | Balakrishnan | 375/240 |
| 5,586,264 | A | 12/1996 | Belknap et al. | 395/200.08 |
| 5,623,483 | A | 4/1997 | Agrawal et al. | 370/253 |
| 5,668,948 | A | 9/1997 | Belknap et al. | 395/200.61 |
| 5,768,527 | A | 6/1998 | Zhu et al. | 395/200.61 |
| 5,808,607 | A | 9/1998 | Brady et al. | 345/327 |
| 5,963,551 | A | 10/1999 | Minko | 370/356 |
| 6,041,354 | A | 3/2000 | Biliris et al. | 709/226 |
| 6,061,504 | A * | 5/2000 | Tzelnic et al. | 709/219 |
| 6,085,252 | A | 7/2000 | Zhu et al. | 709/231 |
| 6,104,757 | A | 8/2000 | Rhee | 375/240 |
| 6,134,596 | A * | 10/2000 | Bolosky et al. | 709/233 |
| 6,175,871 | B1 | 1/2001 | Schuster et al. | 709/231 |
| 6,292,834 | B1 * | 9/2001 | Ravi et al. | 709/233 |
| 6,405,256 | B1 * | 6/2002 | Lin et al. | 709/231 |
| 6,438,630 | B1 * | 8/2002 | DeMoney | 710/56 |
| 6,598,086 | B1 * | 7/2003 | Bell et al. | 709/233 |
| 6,701,372 | B1 * | 3/2004 | Yano et al. | 709/232 |
| 2002/0029274 | A1 * | 3/2002 | Allen | 709/226 |

OTHER PUBLICATIONS

Article entitled, "RTP: A transport protocol for real-time applications", by Schulzrinne et al., IETF, Jan. 2000.
Article entitled, "RTP profile for audio video conferences with minimum control", by Schulzrinne et al., IEFT, Jan. 2000.

(Continued)

*Primary Examiner*—Jeffrey Pwu
(74) *Attorney, Agent, or Firm*—David C. Ripma; Joseph P. Curtin; David A. Cordeiro

(57) ABSTRACT

A system and method have been provided for achieving simultaneous media playout in a network including a server and a plurality of clients. The method comprises: from a server, supplying a media stream to clients at a first bitrate (R1); determining the network delivery requirement; and, in response to the network delivery requirements, modifying the supply of the media stream. Determining the network delivery requirements includes determining either the buffering capacities of the clients, or the media streaming disruptions. To determine the buffering capacities of the dents, a first minimum client buffering capacity (C1) is determined by polling the clients for their respective buffering capacities, and selecting the first minimum buffering capacity (C1) to be equal to the client with the smallest buffering capacity.

26 Claims, 8 Drawing Sheets

OTHER PUBLICATIONS

Article entitled, "Real Time streaming protocol (RTSP)", by Schulzrinne et al., IEFT, 1998.

Article entitled, "Adaptive playout mechanisms for packetized audio applications in wide-area networks", by Ramjee et al., Proceedings of IEEE INFOCOM, pp. 680-688, 1994.

Article entitled, "Synchronized delivery and playout of distributed multimedia streams", by Biersack et al., Multimedia Streams, vol. 7, No. 1, pp. 70-90, Jan. 1999.

Article entitled, "Lip Synchronization for use over the Internet", by Kouvelas et al., Proceedings of IEEE Globecom, Nov. 1996.

Article entitled, "intelligent video smoother for multimedia communications", by Yaung et al., IEEE Journal of Selected Areas in Communications, vol. 15, No. 2, pp. 136-146, Feb. 1997.

Article entitled, "A survey of packet-loss recovery techniques for streaming audio", by Perkins et al., IEEE Network Magazine, pp. 40-47, Sep./Oct. 1998.

* cited by examiner

SYSTEM AND METHOD FOR SIMULTANEOUS MEDIA PLAYOUT

BACKGROUND OF THE INVENTION

1. Field of the Invention

This invention generally relates to multicast or unicast media communications and, more particularly, to a system and method for creating simultaneous media playout at multiple heterogeneous clients.

2. Description of the Related Art

In a streaming media system, a server typically streams media data to multiple clients. Each client has its own capability, which may be different than other clients. For example, each client may have different amount of buffering space available. The server streams the same media stream to all the clients in a multicast session. The goal is for all these clients with different buffering capabilities, is to achieve a simultaneous playback of the media stream. One application of a multicast session is a home-network environment where a single audio server streams a song to multiple client devices, perhaps in different rooms of a home, so that the clients achieve a simultaneous playout of a song.

Because each client has different buffering capabilities, the server needs to adapt its streaming whenever a new client joins the session or leaves the session. When a media packet is transmitted from the server to the clients, the packet may have a variable delay before reaching the clients. This variation in the end-to-end delay is called jitter. As noted by Schulzrinne et al., "RTP: A transport protocol for real-time applications", IETF, January 2000, Sender and Receiver Report (SR, RR) packets of Real-time Transport Control Protocol (RTCP) part of Real-time Transport Protocol (RTP) have a field interarrival jitter that captures the mean deviation of the difference in packet spacing at the client compared to the server for a pair of packets. To compensate for the jitter, a streaming media client often buffers a certain number of packets, and then plays them out at scheduled playout times. A typical streaming media system often transports packets using RTP on top of User Datagram Protocol (UDP). UDP provides an unreliable service where transmitted packets can get lost, arrive out of order, or get duplicated. The client side buffering of data in a streaming media system helps to alleviate the out-of-order packet delivery by rearranging the buffered packets. The client can also discard the duplicate packets. The buffering is also helpful if there is any disruption in the streaming during the session, causing interruption in stream reception for a short time.

The amount of buffering done at the client side in a streaming media system is based mainly on two factors: the available client buffer size, and the acceptable delay which the user can tolerate before the media actually starts playing, after the time of the request. The type of media encoding used may also impose a certain amount of delay before a client can actually start to decode the received packets. This is typically the case for video encoded using any of the popular video encoding standards (e.g. MPEG1, MPEG2, MPEG4, H.263(+)), where the frames are encoded independently (Intra=I frames) or by referring to other frames (Inter=P,B frames). The delay may also be dependent upon whether the media is being played out is a live Stream or an on-demand archived stream.

With respect to the first factor, the available client buffer size, each client can have a different buffer size. In the case where each client is playing the same media stream in a session, it is assumed that packets are application data units and are independently decodable. This is true for majority of the audio encoding standards. The goal is to achieve a simultaneous playout of the media stream at each client. Another problem is the case where clients can join or leave the session midway. Client heterogeneity and dynamic session membership are major problems to be addressed in multicasting.

Adaptive playout delay adjustment and synchronization of streams have been proposed to address the above-mentioned problems. Assuming a media stream consisting of talkspurts interspersed with silence, adaptive playout algorithms have been proposed by Ramjee et al., "Adaptive playout mechanisms for packetizing audio applications in wide-area networks", Proceedings of IEEE INFOCOM, pp. 680–688, 1994. These algorithms estimate the mean and variation in end-to-end delay to adjust the starting time for playout of each talkspurt. However, this work does not address the issue of multiple heterogeneous clients having different buffering capabilities. It is also more targeted towards an interactive conferencing type of systems. Such a solution does not address an on-demand archived media (especially audio) distribution system, that has a continuous media stream without separate talkspurts. Neither does this method address server side adaptation based on different client buffering capabilities.

The other class of related work addresses the problem of synchronization between different media streams in a presentation session. For example, video and audio streams that need to be synchronously presented in a multimedia session. A start-up protocol to initiate synchronized playback of multiple media streams is proposed by Biersack et al., "Synchronized delivery and playout of distributed multimedia steams", Multimedia Systems, Vol. 7, No. 1, pp. 70–90, January 1999. A scheme that allows audio and video stream synchronization using a local conference bus, is also proposed by Kouvelas et al., "Lip Synchronization for use over the Internet", Proceedings of IEEE Globecom, November 1996. These systems address a set of multiple streams transmitted from one or more servers to a single client, with the focus on achieving a synchronized playback of these multiple streams at that client.

Yuang et al., "Intelligent video smoother for multimedia communications", IEEE Journal of Selected Areas in Communications, Vol. 15, No. 2, pp. 136–146, February 1997, describes an intelligent neural network based video smoother that compensates for jitter and smoothes the playout of video frames. However, these solutions do not address the issue of achieving simultaneous playback of the same media stream at multiple heterogeneous clients having different buffering capabilities.

Further, although prior art systems describe client side buffering, none of known solutions appear to handle simultaneous media playout at multiple clients, where each client has a different buffer capacity. Methods designed to achieve isochronous streams appearing simultaneously at output ports cannot handle simultaneous playout when the buffer capacity of each client is different.

It would be advantageous if media could be played out at several clients simultaneously, even if the clients had different buffering capacities.

It would be advantageous if simultaneous playout could be maintained despite disruptions in the media stream.

It would be advantageous if simultaneous playout could be maintained despite changes in client membership during a session.

SUMMARY OF THE INVENTION

The present invention avoids the above-mentioned problems associated with clients having different buffering capacities by permitting simultaneous media playout strategies for multiple heterogeneous clients using server side adaptation. There are three adaptation phase problems that are solved by the invention. The adaptive phases are: when a client joins the session; when a client leaves the session; and, after streaming disruptions.

Accordingly, a method has been provided for achieving simultaneous media playout in a network including a server and a plurality of clients. The method comprises: from a server, supplying a media stream to clients at a first bitrate (R1); determining the network delivery requirement; and, in response to the network delivery requirements, modifying the supply of the media stream.

Determining the network delivery requirements includes determining either the buffering capacities of the clients, or the media streaming disruptions. To determine the buffering capacities of the clients, a first minimum client buffering capacity (C1) is determined by polling the clients for their respective buffering capacities, and selecting the first minimum buffering capacity (C1) to be equal to the client with the smallest buffering capacity.

The method further comprises: following the supplying of media stream at a first bitrate (R1), changing clients in the network; determining the new minimum client buffering capacity (Cnew); and, in response to the new minimum buffering capacity (Cnew), modifying the supply of the media stream. The supply of the media stream is modified by temporarily pausing the supply of the media stream at the first bitrate (R1) if the new minimum buffering capacity (Cnew) is less than the first minimum buffering capacity (C1). Alternately, the media stream bitrate is temporarily increased if the new minimum buffering capacity (Cnew) is greater than the first minimum buffering capacity (C1), or if it has been determined that the supply of the media stream has been disrupted.

Additional details of the above-described simultaneous media playout method, and a system for achieving simultaneous media playout in a network are described below.

DETAILED DESCRIPTION OF THE PREFERRED EMBODIMENTS

Figure 1:
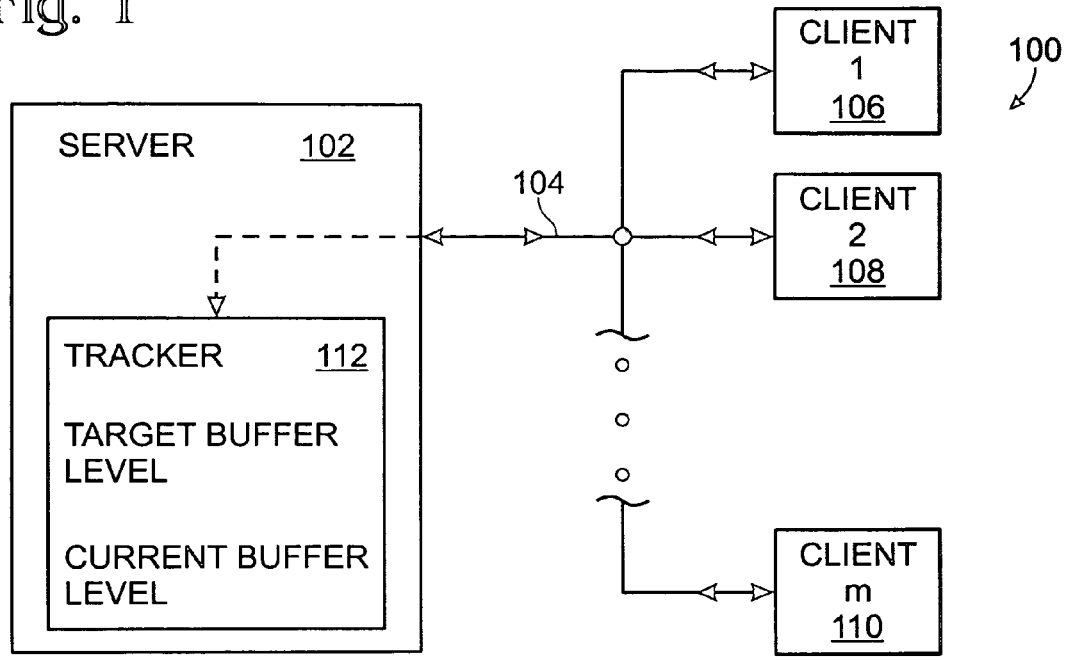
FIG. 1 is a schematic block diagram of the present invention system for achieving simultaneous media playout in a network.

FIG. 1 is a schematic block diagram of the present invention system for achieving simultaneous media playout in a network. The system 100 comprises a server 102 having a network connection port to supply a media stream at a first bitrate (R1) on a network 104. The server 102 determines network delivery requirements and, in response, modifies the supply of the media stream. At least one client has a network connection port to receive the media stream. Shown are client one (106), client two (108), and client M (110). However, the invention is not limited to any particular number of clients. The clients 106–110 transmit their buffering capacities to the server 102.

The server 102 determines the network delivery requirements in response to determining the buffering capacities of the clients. Further, the server determines network delivery requirements in response to determining media streaming disruptions.

With respect to determining the buffering capacity of the clients 106–110, the server 102 determines the first minimum client buffering capacity (C1). The server 102 polls the clients 106–110 for their respective buffering capacities and each client 106–110 transmits their buffering capacity to the server 102, in response to the poll. The server 102 determines the first minimum buffering capacity (C1) to be equal to the client with the smallest buffering capacity.

Each client schedules the playout to be at a time equal to a first time interval (t1) plus the minimum buffering capacity divided by the first bitrate (C1/R1). Prior to supplying a media stream at the first bitrate (R1), the server 102 communicates the first minimum buffering capacity (C1) to the clients. Each client receives the value t1 as a timestamp of the first buffered frame in the media stream. As part of the normal playout procedure, each client 106–110 reorders out-of-order media packets, handles any lost media packets, and schedules the playout of the media packets at a uniform rate in response to the media type and the first bitrate (R1) because the media stream includes media packets with a timestamp.

One major problem addressed by the present invention is that of adding, or removing clients from the network. For example, after supplying the media stream at a first bitrate R1 to client one (106) and client two (108), an additional client, client M (110) is added to the network 104. The server 102 determines the new minimum client buffering capacity (Cnew), in response to the addition of the new client 110 and communicates the new minimum buffering capacity (Cnew) to the clients 106–110. Then, the server 102 modifies the supply of media stream in response to the new minimum buffering capacity (Cnew).

The addition or removal of clients from the network can either raise or lower the new minimum buffering capacity. If the buffering capacity is lowered, the server 102 modifies the supply of the media stream by temporarily pausing the supply of the media stream at the first bitrate (R1). If the buffering capacity is increased, the server 102 temporarily increases the media stream bitrate. Prior to modifying the supply of the media stream, the server 102 communicates the new minimum buffering capacity (Cnew) to the clients 106–110.

More specifically, the server 102 temporarily pauses the supply of the media stream if the new minimum buffering capacity (Cnew) is less than the first minimum buffering capacity (C1). The server 102 temporarily pauses the supply of the media stream by pausing for a time equal to the first minimum buffering capacity minus the new minimum buffering capacity, divided by the first bitrate ((C1−Cnew)/R1). Typically, the server 102 communicates media stream modifications to the clients using real-time-streaming protocol (RTSP). However, the present invention is not limited to any particular type of protocol. There are many pre-exiting protocols that can be modified for use with the system 100.

The server 102 temporarily increases the media stream bitrate if either the new minimum buffering capacity (Cnew) is greater than the first minimum buffering capacity (C1), or the server 102 determines that the supply of the media stream has been disrupted. The server 102 temporarily increases the media stream bitrate if the new minimum buffering capacity is greater than the first minimum buffering capacity by polling the clients and itself to determine the minimum bitrate (Rmin). That is, the server 102 determines the maximum rate at which each client can receive a media stream, and the rate at which it can transmit. The device with the smallest bandwidth is the gating device, and the minimum bitrate (Rmin) is set to be equal to the smallest bandwidth. Note, that the minimum bitrate (Rmin) is greater than the first bitrate (R1). Then, the server 102 supplies the media stream at the minimum bitrate (Rmin) for a time equal to the new minimum buffering capacity minus the first minimum buffering capacity, divided by the minimum bitrate minus the first bitrate ((Cnew−C1)/(Rmin−R1).

To ease the above-mentioned calculations, the present invention uses the concept of a current_buffer_level and a target_buffer_level. The target_buffer_level is the same as the first minimum buffering capacity. Typically, the server 102 supplies media stream data as media packets. The server 102 first determines the current buffer level (Cc), which is the number of media packets buffered at each client 106–110. If the new minimum buffering capacity is less than the current buffer level, the server temporarily pauses the supply of media stream for a time equal to the current buffer level minus the new minimum buffering capacity, divided by the first bitrate ((Cc−Cnew)/R1). This calculation leads to the same results as the equation ((C1−Cnew)/R1) mentioned above.

If the new minimum buffering capacity is greater than the current buffer level, the server 102 polls the clients 106–110 and itself to determine the minimum bitrate (Rmin), as mentioned above, and supplies the media stream at the minimum bitrate (Rmin) for a time equal to the new minimum buffering capacity minus the current buffer level, divided by the minimum bitrate minus the first bitrate ((Cnew−Cc)/(Rmin−R1). The equation leads to the same results as equation ((Cnew−C1)/(Rmin−R1) mentioned above.

The server 102 also temporarily increases the media stream bitrate if it has been determined that the media stream has been disrupted. The server 102 polls the clients 106–110 and itself to determine the minimum bitrate (Rmin), and supplies the media stream at the minimum bitrate (Rmin) for a time equal to new minimum buffering capacity minus the current buffering capacity, divided by the minimum bitrate minus the first bitrate ((Cnew−Cc)/(Rmin−R1).

In some aspects of the invention, the server 102 includes a tracker 110 to maintain a current-buffer-level measurement of the number of media packets being supplied by the server and a target-buffer-level measurement of the new minimum client buffer. The server 102 modifies the supply of the media stream in response to the current-buffer-level and target-buffer-level measurements maintained by the tracker 110, using the equations mentioned above.

Below, some examples are given of the above-mentioned system 100 in operation, and additional details to understand the problems solved with the use of the present invention.

Adaptation Phase When a Client Joins the Session on the Network

Assume that the media is encoded, although the same analysis holds true for uncompressed media data, at a bitrate of R1 bits per second (bps). Frame-based media encoding is also assumed. Various audio coding standards (e.g. G.723, G.728, G.729, GSM, MP3, etc.) fall under this category. Also assume that there are M heterogeneous clients having buffer sizes $\{C_1, C_2, \ldots, C_M\}$ bits, currently receiving the media stream. Every time a new client joins to receive the current media stream, the server queries its buffering capabilities. Assuming the client and server to be using Real-time Streaming Protocol (RTSP), the server could query the client buffering capability using a transaction similar to one shown below.

Getting Client Buffer Size:
Server→Client:
GET_PARAMETER rtsp://myhomenw.com/filez/song1.mp3
RTSP/1.0
CSeq: 1089
Content-type: text/parameters
Session: 8438
Content-length: 18
CRLF
buffer_size_bits
CRLF
Client→Server:
RTSP/1.0 200 OK
CSeq: 1089
Content-length: 24
Content-type: text/parameters
CRLF
buffer_size_bits: 64000
CRLF The server keeps track of the buffering capabilities of each client. Let C1 bits denote the minimum buffer size of the currently participating clients, i.e. $C1=Min(C_1, C_2, \ldots, C_M)$. It is assumed that each media packet streamed has a sequence number and a timestamp field (each RTP packet has a sequence number and a timestamp field). The sequence number can be used at the client side to detect duplicate, out-of-order and missing packets. The timestamp can be used to keep track of packet jitter and also to determine the playout scheduling of packets. Every time the buffering capacity changes as a result of a new client joining the media stream, with the buffering capability being equal to the least of the currently existing clients, the server communicates the new minimum buffering capacity (Cnew) value to all the clients. Assuming the server and client to be using RTSP, this can be done using a transaction similar to one shown below.

Setting Client's Buffering Level:
Server→Client:
SET_PARAMETER rtsp://myhomenw.com/filez/song1.mp3 RTSP/1.0
CSeq: 1094
Content-length: 18
Content-type: text/parameters
CRLF
buffering_size: 38400
CRLF
Client→Server:
RTSP/1.0 200 OK
CSeq: 1094
Content-length: 7
Content-type: text/parameters
CRLF
38400
CRLF It is assumed that the server has also communicated the media stream first bitrate R1. This will typically be done as a part of the Setup process, or could be done using the SET_PARAMETER method as above (assuming the server and clients to be using RTSP). The media stream itself may already carry the bitrate information (e.g. MP1, MP2, MP3, G.723.1).

Every time a new client joins the session, after going through the setup and capabilities exchange process, the new client:

Buffers and re-orders the incoming packets,
Schedules the playout of the first buffered frame with timestamp=t1, at time $$\left(t1 + \frac{C1}{R1}\right),$$

Schedules the playout of the next buffered frames in order at the uniform rate based on the type of media encoding and the first bitrate R1.

Every time a new client joins, the server goes through the steps of setup and capabilities exchange. If the new client changes (lowers) the buffering capacity, assuming C1 and Cnew refer to the old and the new minimum client buffer space, the server:

Communicates the Cnew value to all the clients.
Pauses the media transmission for time $$\left(\frac{(C1 - Cnew)}{R1}\right)$$

and then restarts the media delivery at the usual rate of R1. If the server and client are using RTSP, then this pause in the media transmission is equivalent to a request from client as shown below:

Pause rtsp://myhomenw.com/filez/song1.mp3 RTSP/1.0
CSeq: 1145
Range: npt=48
Session: 8438 where in the above example, the pause occurs at time 48 seconds and will last for $$\left(\frac{(C1 - Cnew)}{R1}\right)$$

seconds.

During the adaptation period (pause period) of the server:
If a new client joins, thus lowering the current buffering capacity, the server can just augment the pause (increase it) based on the value of Cnew and communicate the Cnew value to the clients. Denoting the old Cnew value as C1, and the newer value as Cnew ((Cnew) newer). The total pause time duration, including the already paused time, will be $$\left(\frac{C1 - Cnew}{R1}\right).$$

If a client leaves, thus increasing the current buffering capacity, the server will complete the calculated pause before reacting to this buffering capacity change. The adaptation at the end of the pause period will be done according to the procedure described in the next section.

Figure 2:
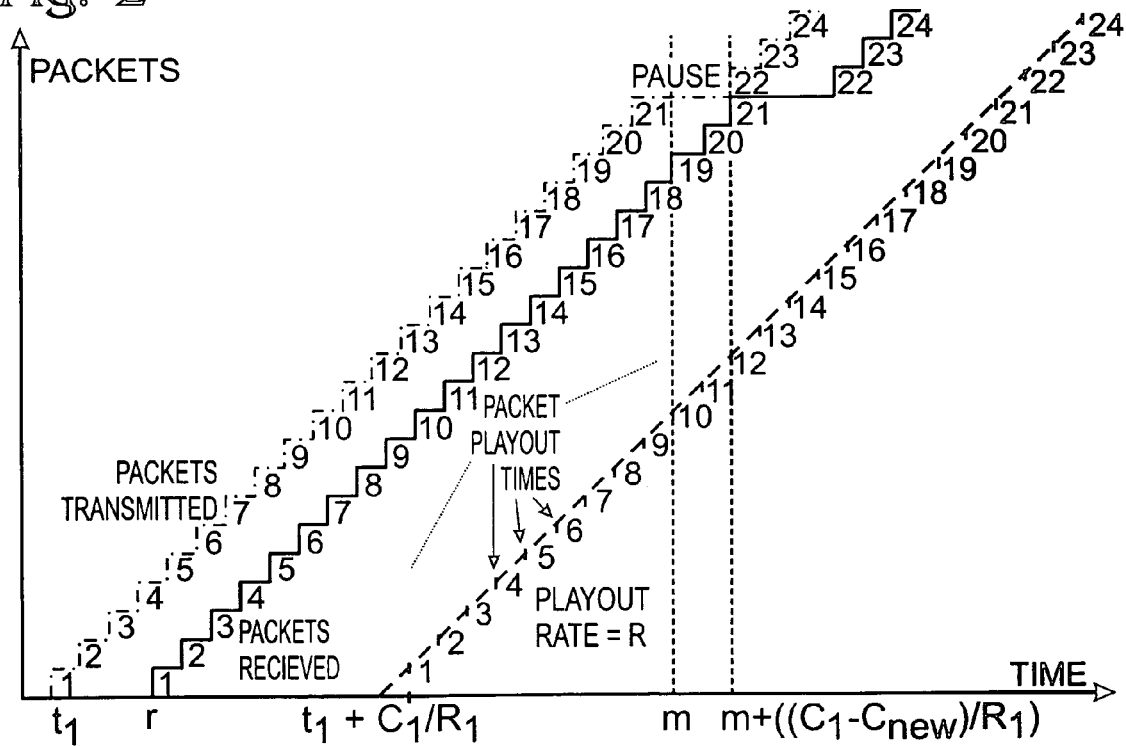
FIGS. 2 through 4 illustrate three examples, where a new client having a lower buffering capability joins the session midway (at time m), thus lowering the buffer capacity.
Figure 3:
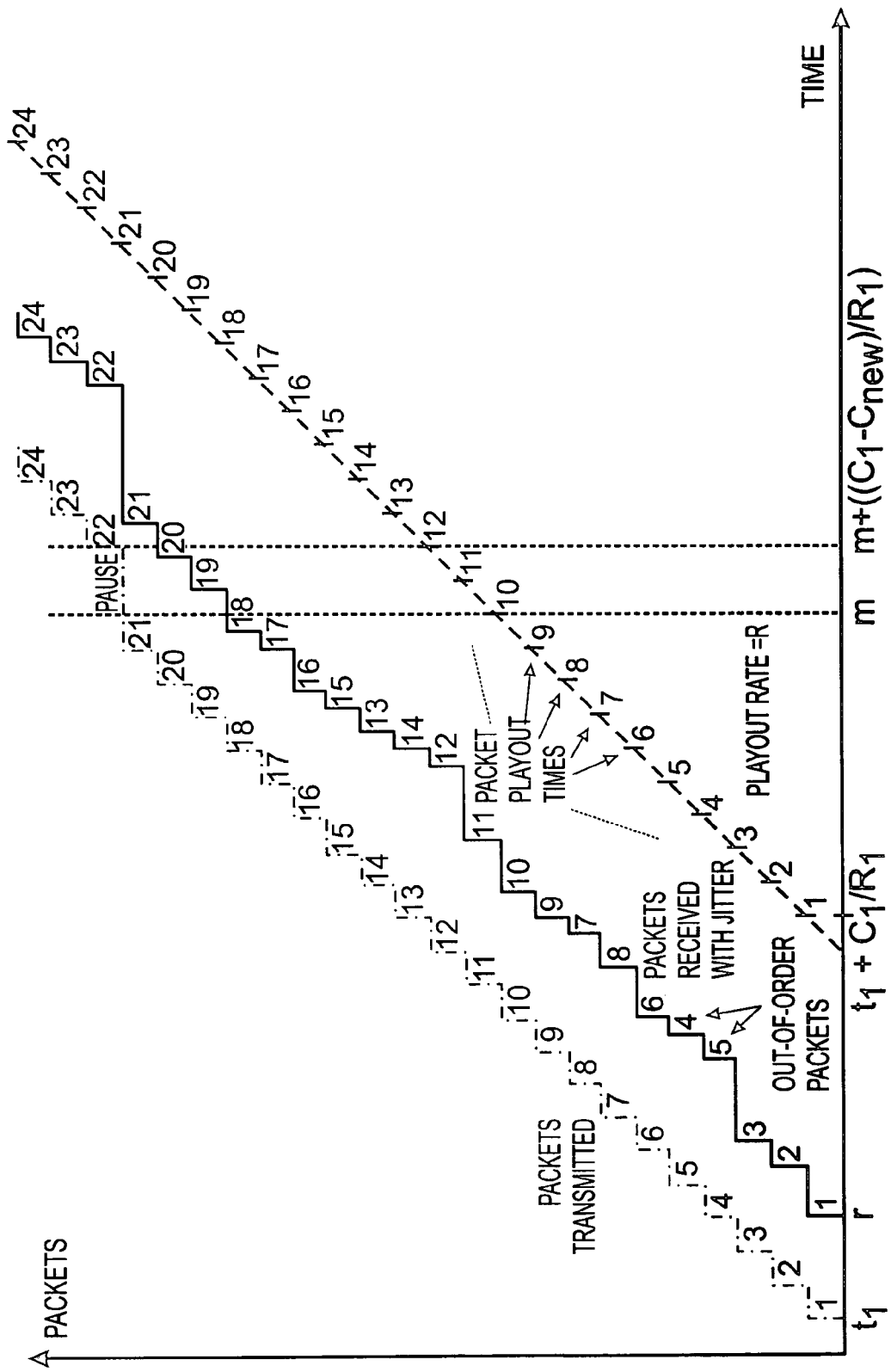
Figure 4:
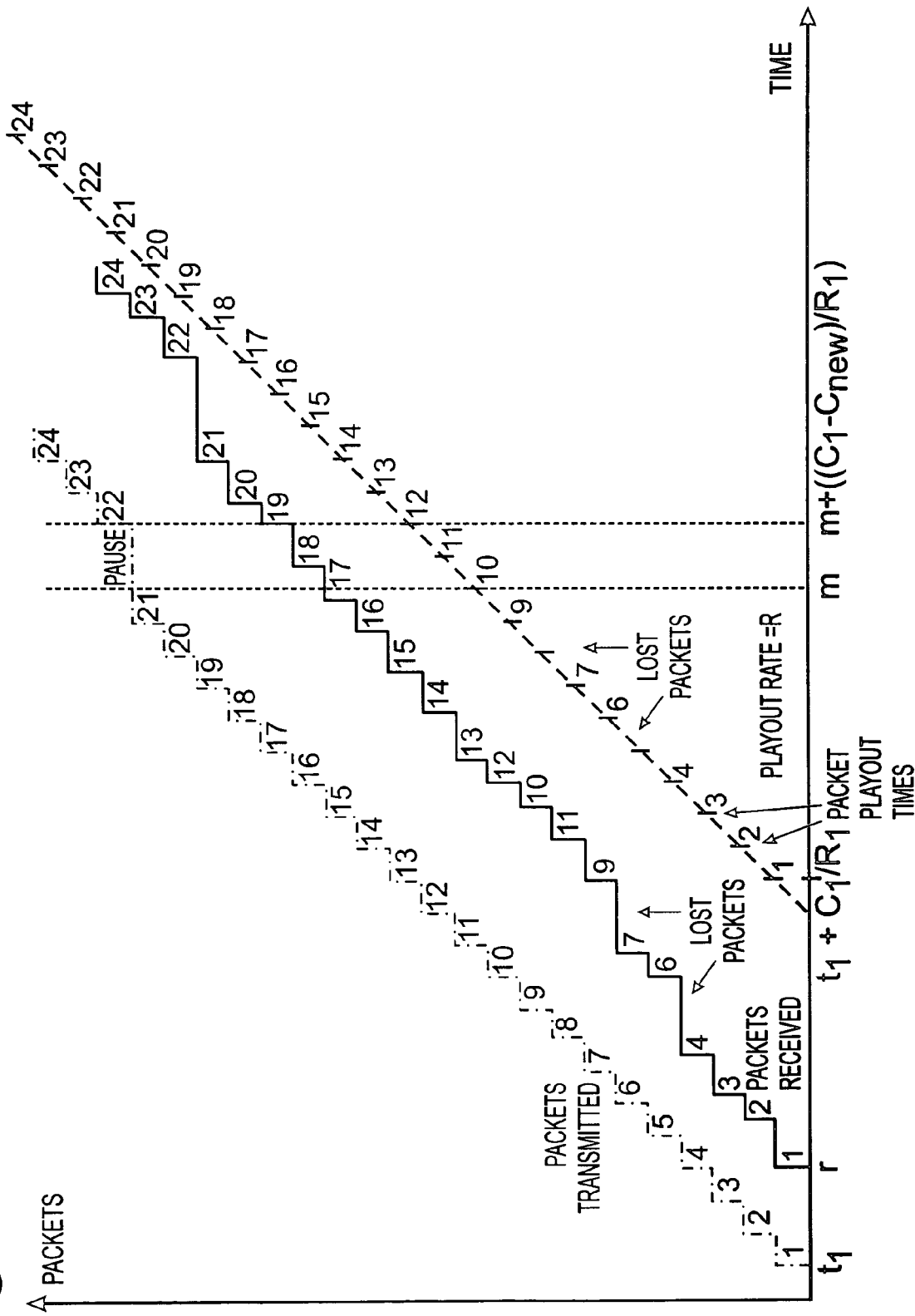

FIGS. 2 through 4 illustrate three examples, where a new client having a lower buffering capability joins the session midway (at time m), thus lowering the buffer capacity. The first example (FIG. 2) shows packet transmission at the server, packet reception at the client, and the packet playout schedule at the client in the case when there is no interarrival packet jitter, no out-of-order packet delivery, and no packet loss. The second example (FIG. 3) illustrates the situation of FIG. 2 with packet jitter and out-of-order packet delivery. The third example (FIG. 4) includes packet jitter, out-of-order packet delivery and packet loss. As can be seen from the figures, buffering can absorb the packet jitter and out of order packets. A packet loss could be handled using some receiver-based method. This can be a simple repetition of the last packet, a silent frame insertion, or some complex interpolation of data surrounding the missing data.

Adaptation Phase When a Client Leaves the Session

Every time a client leaves the session (TEARDOWN message received, if using RTSP), the server computes new value of the minimum buffering capacity Cnew. If this value is higher than the previous value (C1), the server computes minimum of the maximum available reception bandwidth amongst all the clients. This is achieved by querying the maximum client bandwidth (bitrate) using GET_PARAMETER method. Based on the type of connection, this bandwidth (bitrate) may vary over time, so the server uses the most recent estimate of the client bandwidth (bitrate). Assuming the server and client using RTSP, this estimate can also be obtained from the client in its Bandwidth header field {section 12.6 of the real time streaming protocol (RTSP)}. Let Rclient=Min (Rclient1, Rclient2, ..., RclientM) be the minimum of the maximum available client bandwidths and assume that Rmin>R1. Let $R_{server}$ be the maximum rate at which the server can stream media data. It is assumed further that the media stream being transmitted is already encoded and is available completely (as in case of an on-demand archived stream). Then the server can stream at a higher rate of Rmin=Min(Rclient, $R_{server}$) bps, for time $$T_h = \frac{Cnew - C1}{R\min - R1}$$

seconds and then revert back to the transmission rate of R1 bps. If the server and client are using RTSP, then this change in speed of transmission is equivalent to the requests from the client as shown below:

Play rtsp://myhomenw.com/filez/song1.mp3 RTSP/1.0
CSeq: 1150
Range: npt=104–120
Speed: 1.2
Session: 8438
Play rtsp://myhomenw.com/filez/song1.mp3 RTSP/1.0
CSeq: 1150
Range: npt=120
Speed: 1.0
Session: 8438

Assuming that $$\frac{R\min}{R1} = 1.2, \text{ and } \frac{Cnew - C1}{R\min - R1} = 16 \text{ seconds},$$

the server transmission change occurs at time 104 seconds. The server also communicates Cnew to all the clients (which being higher than previous Cnew (now called C1) can be used by the clients to get ready to receive media data at a higher rate).

Figure 5A:
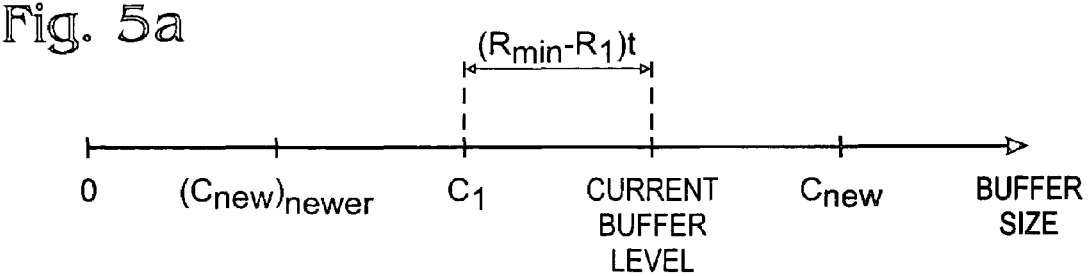
FIGS. 5a through 5c illustrate additional examples of the present invention adaptation process.
Figure 5B:
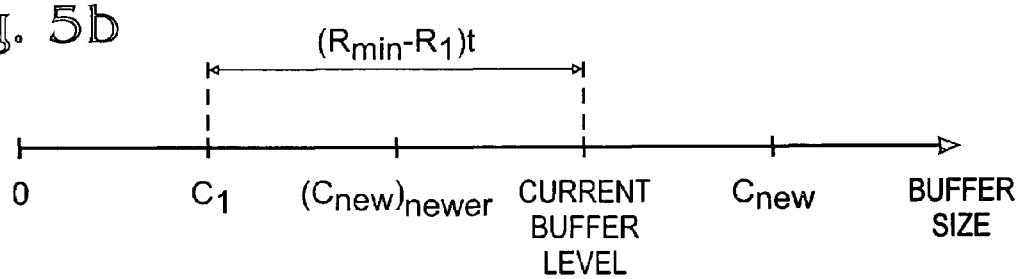
Figure 5C:
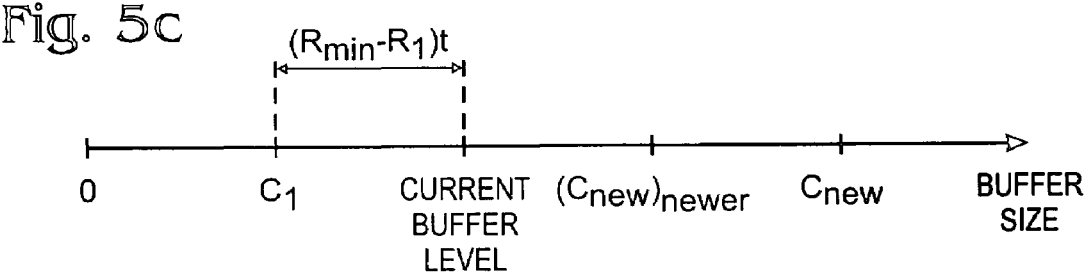

FIGS. 5a through 5c illustrate additional examples of the present invention adaptation process. During the adaptation period (increased rate transmission time period) of the server, if a newer client joins at time t, thus lowering the buffering capacity:

Case 1: If (Cnew<(Rmin−R1)t+C1) (FIGS. 5a and 5b), the server immediately pauses the transmission for time $$\left(\frac{(C1 + (R\min - R1)t - Cnew)}{R1}\right),$$

where t is the total duration the media was transmitted at rate Rmin. After this pause the server reverts back to the original transmission rate of R1.

Case 2: If (Cnew>(Rmin−R1)t+C1) (FIG. 5c), the server calculates a newer value of Rmin, and streams at this increased rate for time $$\frac{(Cnew - C1) - (R\min - R1)t}{(R\min - R1)}.$$

After this increased rate transmission time period the server reverts back to the original transmission rate of R1.

Case 3: If (Cnew=(Rmin−R1)t+C1), server reverts the transmission to the rate R1.

The implementation of the above three cases can be simplified by assuming a hypothetical buffer at the server side. Two variables: current_buffer_level and target_buffer_level can be used to keep track of the fill level and the target level of the hypothetical buffer. If a newer client joins, thus lowering the buffering capacity, the target_buffer_level is set to the Cnew. Then, the three cases above can be implemented as follows.

Case 1: If (target_buffer_level<current_buffer_level), the transmission pauses for time $$\frac{(\text{current\_buffer\_level} - \text{target\_buffer\_level})}{R1},$$

then reverts back to the transmission at the rate of R1.

Case 2: If (target_buffer_level>current_buffer_level), a new Rmin is found, where Rmin=Min(Rclient, $R_{server}$), and the media stream is supplied at this increased rate for time $$\frac{(\text{target\_buffer\_level} - \text{current\_buffer\_level})}{R\min - R1}.$$

Then, the media stream supply reverts back to rate R1.

Case 3: If (target_buffer_level=current_buffer_level), the media stream supply reverts back to the rate R1.

If a client leaves, thus increasing the buffering capacity, the server does not react to this change until the end of the current increased speed interval. The server acts on this new change (with another possible increased speed transmission interval) at the end of the current interval.

When a client leaves the session, thus increasing the buffering capacity, the server may choose to do no adaptation (increased rate transmission). This maybe because some clients do not support increased bandwidth reception, or because the server cannot handle the increased speed transmission adaptation phase for some reason. In this case, the system will work with a sub-optimal buffering behavior, which may result in some missed playout schedules. Essentially the system will continue to behave as if the lower buffering capacity client is still active.

Figure 6:
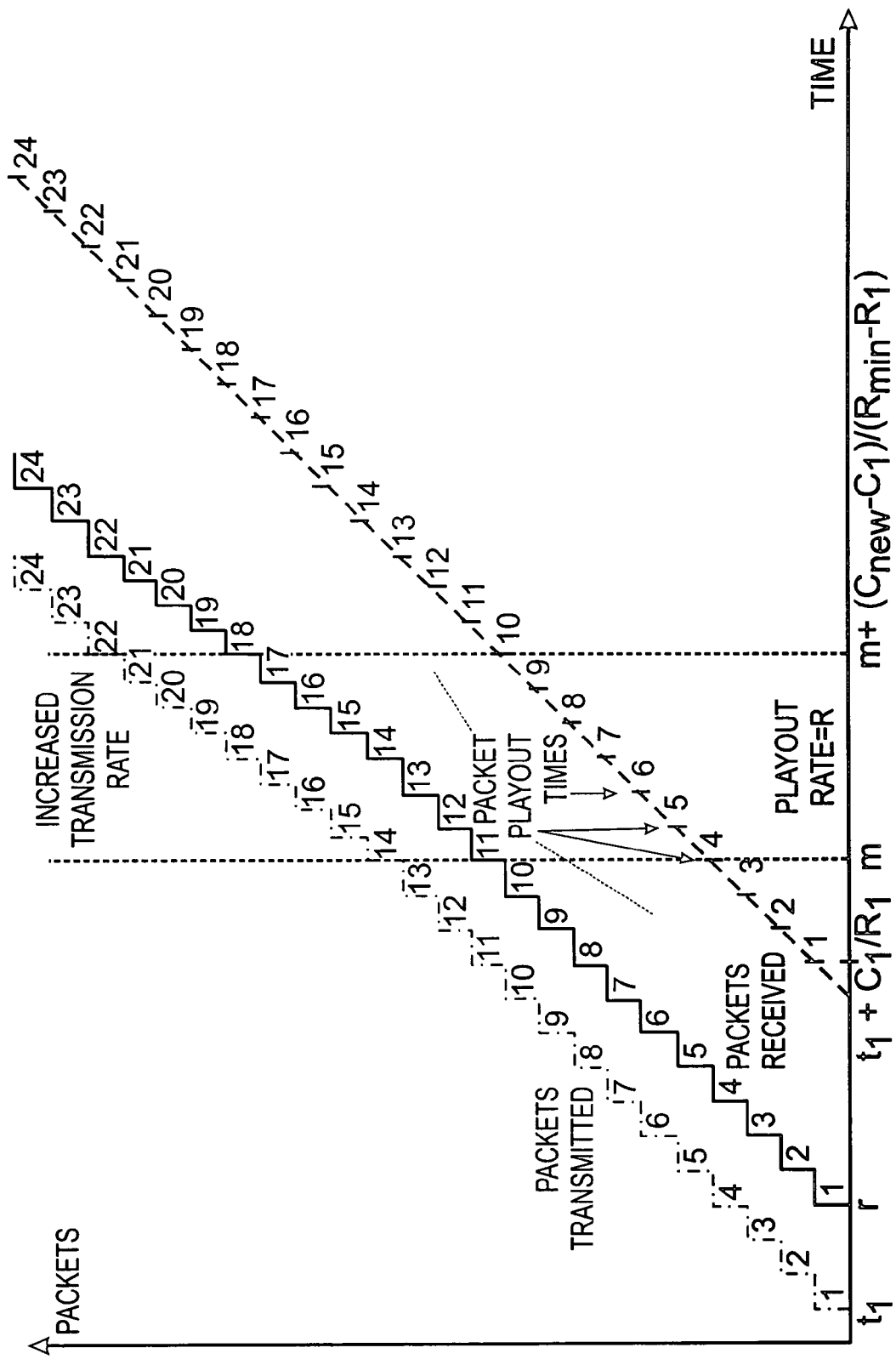
FIGS. 6 through 8 illustrate a scenario where a client leaves the session midway (at time m), thus increasing the buffering capacity.
Figure 7:
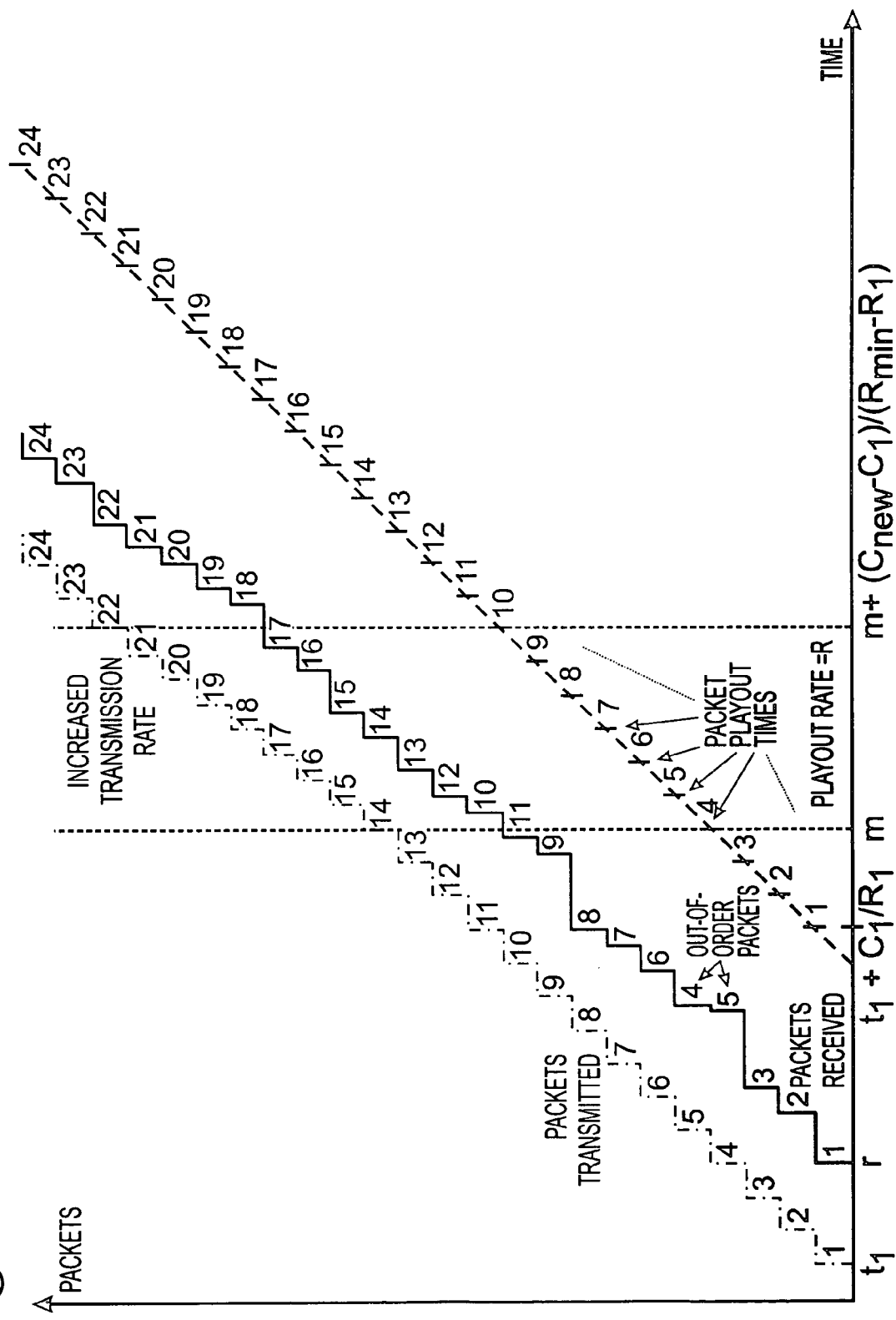
Figure 8:
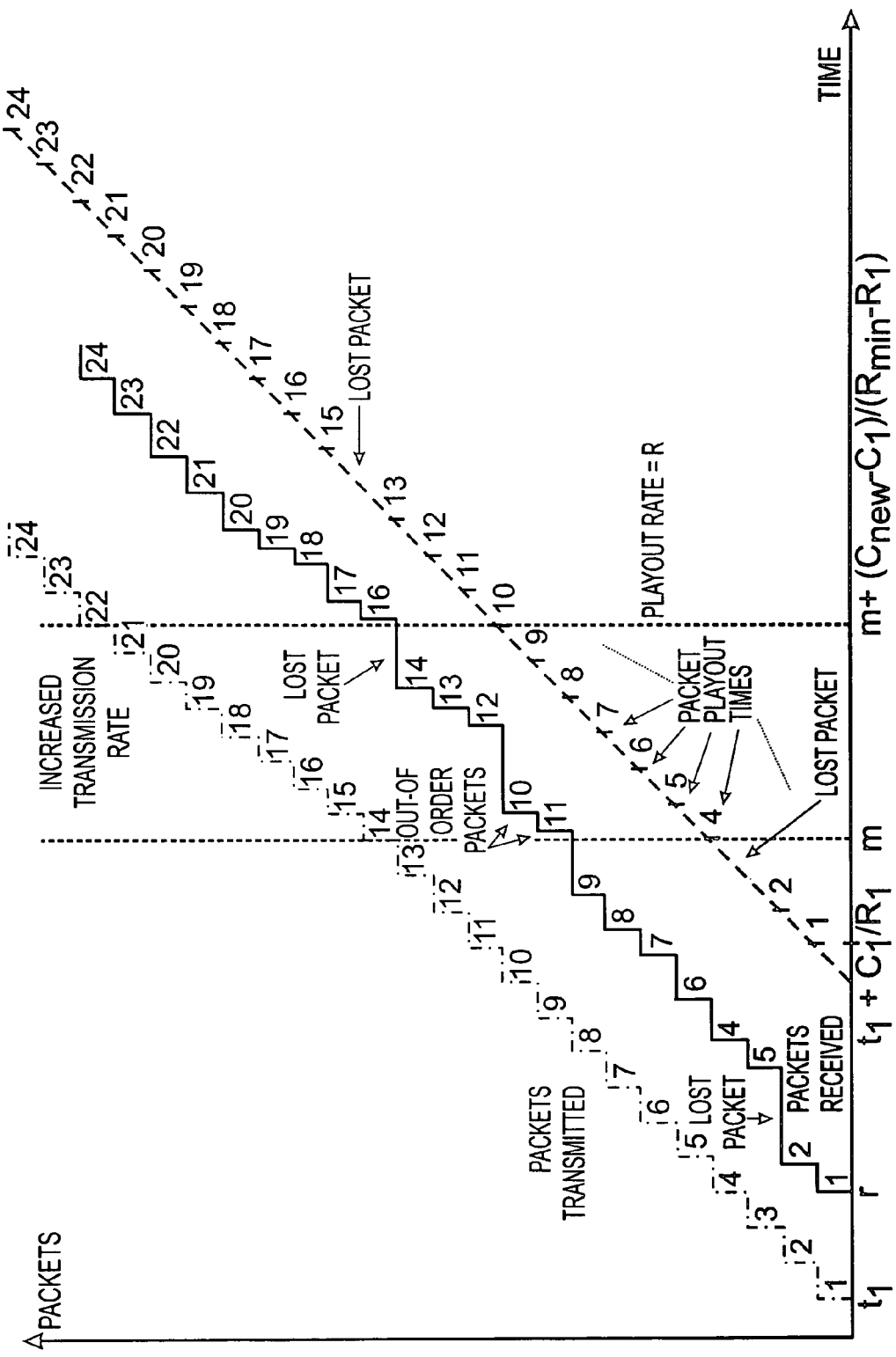

FIGS. 6 through 8 illustrate a scenario where a client leaves the session midway (at time m), thus increasing the buffering capacity. The first case (FIG. 6) shows packet transmission at the server, packet reception at the client, and the packet playout schedule at the client in the case when there is no interarrival packet jitter, no out-of-order packet delivery, and no packet loss. The second case (FIG. 7) shows the same in the presence of the packet jitter and out-of-order packet delivery. The third case (FIG. 8) includes packet jitter, out-of-order packet delivery, and packet loss.

Adaptation Phase After Streaming Disruptions

During the transmission session, the network load or competing traffic can result in congestion, and the session throughput from the server to clients can fall for a short duration. In this case after the congestion is over, the server can go through an adaptation phase similar to the adaptation phase when a client leaves the session, as mentioned above. As before, the period of high rate transmission can be calculated through the two variables: current_buffer_level and target_buffer_level, to keep track of the fill level and the target level of the hypothetical buffer at the server side. The target_buffer_level is equal to the minimum client buffer size and the current_buffer_level is determined by keeping track of the data streamed from the server and played out at the clients. In this case, because of the stream disruption, (target_buffer_level>current_buffer_level), the server can find a new Rmin, where Rmin=Min(Rclient, $R_{server}$), and stream at this increased rate for time $$\frac{(\text{target\_buffer\_level} - \text{current\_buffer\_level})}{R\min - R1}.$$

The server then reverts back to rate R1. If a new client joins during this adaptation phase, thus lowering the buffering capacity, target_buffer_level is set to the newer minimum buffering capacity Cnew, and the 3 cases as described in the previous section are checked and acted on accordingly. This adaptation phase can also be carried out every time the difference (target_buffer_level−current_buffer_level) exceeds some threshold.

Figure 9B:
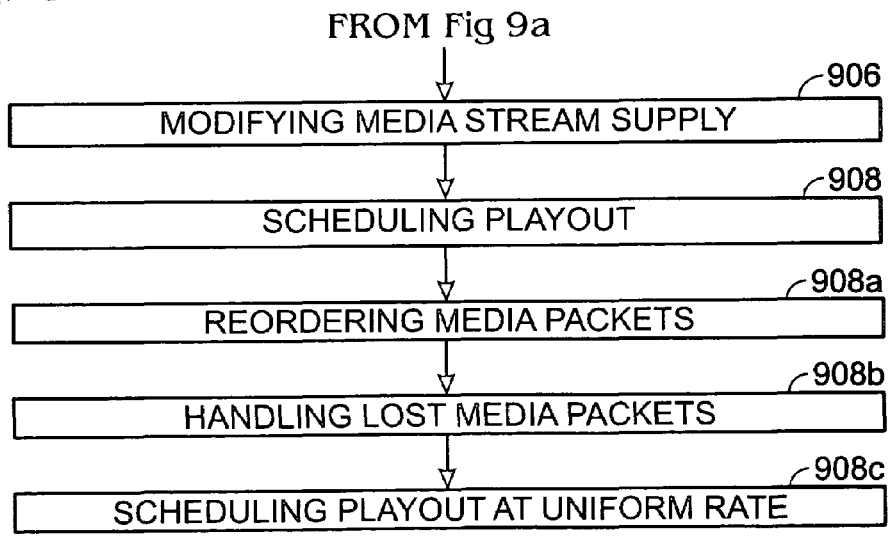
FIGS. 9a and 9b are flowcharts illustrating the present invention method for achieving simultaneous media playout in a network including a server and a plurality of clients.
Figure 9A:
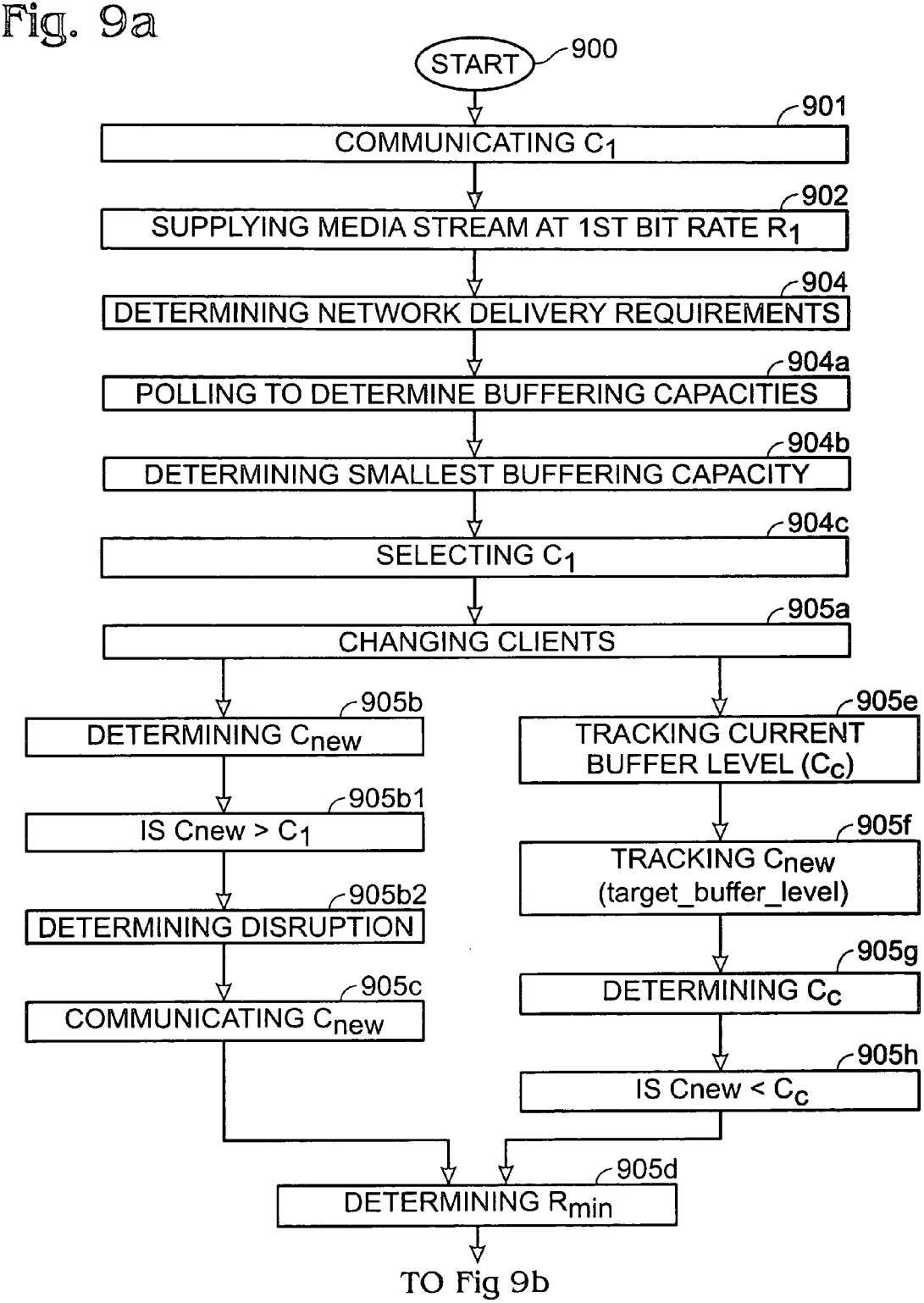

FIGS. 9a and 9b are flowcharts illustrating the present invention method for achieving simultaneous media playout in a network including a server and a plurality of clients. Although the method is depicted as a sequence of numbered steps for clarity, no order should be inferred from the numbering unless explicitly stated. The method begins at Step 900. Step 902, from a server, supplies a media stream to clients at a first bitrate (R1). Step 904 determines the network delivery requirement. Step 906, in response to the network delivery requirements, modifies the supply of the media stream.

Determining the network delivery requirements in Step 904 includes determining the buffering capacities of the clients, or determining media streaming disruptions. When determining the buffering capacities of the clients, the first minimum client buffering capacity (C1) is determined. Determining the first minimum client buffering capacity (C1) in Step 904 includes substeps. Step 904a polls the clients for their respective buffering capacities. Step 904b determines which client has the smallest buffering capacity. Step 904c selects the first minimum buffering capacity (C1) to be equal to the client with the smallest buffering capacity.

A further step, Step 908, at each client, schedules the playout to be at a time equal to a first time interval (t1) plus the minimum buffering capacity divided by the first bitrate (C1/R1). Step 901, prior to supplying a media stream at the first bitrate (R1), communicates the first minimum buffering capacity (C1) to the clients.

Following the supplying of media stream at a first bitrate (R1) in Step 902, Step 905a changes clients in the network. Step 905b determines the new minimum client buffering capacity (Cnew). Step 905c communicates the new minimum buffering capacity (Cnew) to the clients. Step 906, in response to the new minimum buffering capacity (Cnew), modifies the supply of the media stream. Modifying the supply of the media stream in Step 906 includes temporarily pausing the supply of the media stream at the first bitrate (R1), or temporarily increasing the media stream bitrate.

Temporarily pausing the supply of the media stream at the first bitrate (R1) in Step 906 includes temporarily pausing the supply of the media stream if the new minimum buffering capacity (Cnew) is less than the first minimum buffering capacity (C1). More specifically, Step 906 includes pausing for a time equal to the first minimum buffering capacity minus the new minimum buffering capacity, divided by the first bitrate ((C1−Cnew)/R1).

Determining the new minimum buffering capacity (Cnew) in Step 905b includes substeps. Step 905b1 determines if the new minimum buffering capacity (Cnew) is greater than the first minimum buffering capacity (C1). Step 905b2 determines if the supply of the media stream has been disrupted. Modifying the supply of the media stream in Step 906 then includes temporarily increasing the media stream bitrate.

Step 905d polls the clients and the server to determine the minimum bitrate (Rmin). Then, modifying the supply of the media stream in Step 906 includes supplying the media stream at the minimum bitrate (Rmin) for a time equal to the new minimum buffering capacity minus the first minimum buffering capacity, divided by the minimum bitrate minus the first bitrate ((Cnew−C1)/(Rmin−R1)).

In some aspects of the invention, Step 905e, at the server, maintains a current_buffer_level measurement to track the number of media packets supplied by the server. Step 905f, at the server, maintains a target_buffer_level measurement to track the new minimum client buffering capacity (Cnew). Modifying the supply of the media stream in Step 906 includes modifying the supply of the media stream in response to the current_buffer_level and target_buffer_level measurements.

Supplying a media stream from a server to clients at a first bitrate (R1) in Step 902 includes supplying data as media packets with a timestamp. Step 905g determines the current buffer level (Cc), which is the number of media packets buffered at each client. Step 905h determines if the new minimum buffering capacity is less than the current buffer level. Modifying the supply of the media stream in Step 906 includes temporarily pausing the supply of media stream for a time equal to the current buffer level minus the new minimum buffering capacity, divided by the first bitrate ((Cc−Cnew)/R1).

Step 905d still polls the clients and the server to determine the minimum bitrate (Rmin). Modifying the supply of the media stream in Step 906 includes supplying the media stream at the minimum bitrate (Rmin) for a time equal to the new minimum buffering capacity minus the current buffer level, divided by the minimum bitrate minus the first bitrate ((Cnew−Cc)/(Rmin−R1)).

Determining the current_buffer_level in Step 905g includes determining that the media stream has been disrupted. Then, modifying the supply of the media stream in Step 906 includes supplying the media stream at the minimum bitrate (Rmin) for a time equal to new minimum buffering capacity minus the current_buffer_level, divided by the minimum bitrate minus the first bitrate ((Cnew−Cc)/(Rmin−R1)).

Communicating the media stream modifications to the clients from the server in Steps (and Substeps of) 904 and 905 typically includes using real-time-streaming protocol (RTSP).

Scheduling the playout to be at a time equal to a first time interval (t1) plus the minimum buffering capacity divided by the first bitrate (C1/R1) in Step 908 includes substeps. Step 908a, at each client, reorders out-of-order media packets. Step 908b, at each client, handles any lost media packets. Step 908c, at each client, schedules the playout of the media packets at a uniform rate in response to the media type and the first bitrate (R1).

A system and method have been provided for adapting the distribution of media for simultaneous playout with heterogeneous clients. Some examples have been given of controlling the supply of media stream through the tracking of client buffering capacities. However, other variations and embodiments of the present invention will occur to those skilled in the art.

I claim:

1. In a network including a server and a plurality of clients, a method for achieving simultaneous media playout, the method comprising:
    from a server, supplying media stream data as media packets with a time stamp, to clients at a first bitrate (R1);
    determining the network delivery requirement, including the first minimum client buffering capacity (C1) by:
        polling the clients for their respective buffering capacities;
        determining which client has the smallest buffering capacity; and,
        selecting the first minimum buffering capacity (C1) to be equal to the client with the smallest buffering capacity;
    in response to the network delivery requirements, modifying the supply of the media stream;

at each client, scheduling media playout to be at a time equal to a first time interval (t1) plus the minimum buffering capacity divided by the first bitrate (C1/R1) by:
  at each client, reordering out-of-order media packets;
  at each client, handling any lost media packets; and,
  at each client, scheduling the playout of the media packets at a uniform rate in response to the media type and the first bitrate (R1).

2. The method of claim 1 wherein determining the network delivery requirements includes determining media streaming disruptions.

3. The method of claim 1 further comprising:
prior to supplying a media stream at the first bitrate (R1), communicating the first minimum buffering capacity (C1) to the clients.

4. The method of claim 3 further comprising:
following the supplying of media stream at a first bitrate (R1), changing clients in the network;
determining the new minimum client buffering capacity (Cnew); and,
wherein modifying the supply of the media stream includes modifying the supply of the media stream in response to the new minimum buffering capacity (Cnew).

5. The method of claim 4 wherein modifying the supply of the media stream includes temporarily pausing the supply of the media stream at the first bitrate (R1), and temporarily increasing the media stream bitrate.

6. The method of claim 5 further comprising:
prior to modifying the supply of the media stream, communicating the new minimum buffering capacity (Cnew) to the clients.

7. The method of claim 6 wherein temporarily pausing the supply of the media stream at the first bitrate (R1) includes temporarily pausing the supply of the media stream if the new minimum buffering capacity (Cnew) is less than the first minimum buffering capacity (C1).

8. The method of claim 7 wherein temporarily pausing the supply of the media stream, if the new minimum buffering capacity is less than the first minimum buffering capacity, includes pausing for a time equal to the first minimum buffering capacity minus the new minimum buffering capacity, divided by the first bitrate ((C1−Cnew)/R1).

9. The method of claim 5 wherein determining the new minimum buffering capacity includes:
determining if the new minimum buffering capacity (Cnew) is greater than the first minimum buffering capacity (C1);
determining if the supply of the media stream has been disrupted; and,
wherein modifying the supply of the media stream includes temporarily increasing the media stream bitrate.

10. The method of claim 9 further comprising:
polling the clients and the server to determine the minimum bitrate (Rmin); and,
wherein modifying the supply of the media stream includes supplying the media stream at the minimum bitrate (Rmin) for a time equal to the new minimum buffering capacity minus the first minimum buffering capacity, divided by the minimum bitrate minus the first bitrate ((Cnew−C1)/(Rmin−R1).

11. The method of claim 5 wherein supplying a media stream from a server to clients at a first bitrate (R1) includes supplying data as media packets;
wherein determining the new minimum buffering capacity includes:
determining the current_buffer_level (Cc), which is the number of media packets buffered at each client;
determining if the new minimum buffering capacity is less than the current buffer level; and,
wherein modifying the supply of the media stream includes temporarily pausing the supply of media stream for a time equal to the current_buffer_level minus the new minimum buffering capacity, divided by the first bitrate ((Cc−Cnew)/R1).

12. The method of claim 11 further comprising:
polling the clients and the server to determine the minimum bitrate (Rmin); and,
wherein modifying the supply of the media stream includes supplying the media stream at the minimum bitrate (Rmin) for a time equal to the new minimum buffering capacity minus the current_buffer_level divided by the minimum bitrate minus the first bitrate ((Cnew−Cc)/(Rmin−R1).

13. The method of claim 12 wherein determining the current_buffer_level includes determining if the media stream has been disrupted; and,
wherein modifying the supply of the media stream includes supplying the media stream at the minimum bitrate (Rmin) for a time equal to new minimum buffering capacity minus the current_buffer_level, divided by the minimum bitrate minus the first bitrate ((Cnew−Cc)/(Rmin−R1).

14. The method of claim 13 further comprising;
at the server, maintaining a current_buffer_level (Cc) measurement to track the number of media packets supplied by the server; and
at the server, maintaining a target_buffer-level measurement to track the new minimum client buffering capacity (Cnew); and,
wherein modifying the supply of the media stream includes modifying the supply of the media stream in response to the current_buffer_level and target_buffer_level measurements.

15. The method of claim 5 further comprising:
from the server, communicating the media stream modifications to the clients using real-time-streaming protocol (RTSP).

16. A system for achieving simultaneous media playout in a network, the system comprising:
a server having a network connection port to supply a media stream at a first bitrate (R1), the server determining network delivery requirements, including client buffering capacities, by polling clients for their respective buffering capacities and determining a first minimum buffering capacity (C1) to be equal to the client with the smallest buffering capacity, and prior to supplying a media stream at the first bitrate (R1), communicating the first minimum buffering capacity (C1) to clients; and,
at least one client having a network connection port to receive the media stream, to transmit their buffering capacities to the server in response to a poll, and to schedule a media playout to be at a time equal to a first time interval (t1) plus the minimum buffering capacity divided by the first bitrate (C1/R1);
wherein the server determines a new minimum client buffering capacity (Cnew), in response to a chance in the number of clients, communicates the new minimum buffering capacity (Cnew) to the clients, and modifies the supply of media stream in response to the new minimum buffering capacity (Cnew) by performing a process selected from the group including temporarily pausing the supply of the media stream at the first bitrate (R1) and temporarily increasing the media stream bitrate; and, wherein the server temporarily pauses the supply of the media stream if the new minimum buffering capacity (Cnew) is less than the first minimum buffering capacity (C1).

17. The system of claim 16 wherein the server determines the network delivery requirements in response to determining media streaming disruptions.

18. The system of claim 16 wherein the server temporarily pauses the supply of the media stream by pausing for a time equal to the first minimum buffering capacity minus the new minimum buffering capacity, divided by the first bitrate ((C1−Cnew)/R1).

19. The system of claim 16 wherein the server temporarily increases the media stream bitrate as follows:
  if the new minimum buffering capacity (Cnew) is greater than the first minimum buffering capacity (C1); and,
  if the server determines that the supply of the media stream has been disrupted.

20. The system of claim 19 wherein the server temporarily increases the media stream bitrate if the new minimum buffering capacity is greater than the first minimum buffering capacity, by polling the clients and itself to determine the minimum bitrate (Rmin), and supplying the media stream at the minimum bitrate (Rmin) for a time equal to the new minimum buffering capacity minus the first minimum buffering capacity, divided by the minimum bitrate minus the first bitrate ((Cnew−C1)/(Rmin−R1).

21. The system of claim 16 wherein the server supplies media stream data as media packets;
  wherein the server determines the current_buffer_level (Cc), which is the number of media packets buffered at each client, and if the new minimum buffering capacity is less than the current_buffer_level, the server temporarily pauses the supply of media stream for a time equal to the current_buffer_level minus the new minimum buffering capacity, divided by the first bitrate ((Cc−Cnew)/R1).

22. The system of claim 21 wherein the server, if the new minimum buffering capacity is greater than the current buffer level, polls the clients and itself to determine the minimum bitrate (Rmin), and supplies the media stream at the minimum bitrate (Rmin) for a time equal to the new minimum buffering capacity minus the current_buffer_level divided by the minimum bitrate minus the first bitrate ((Cnew−Cc)/(Rmin−R1).

23. The system of claim 22 wherein the server temporarily increases the media stream bitrate, if it has been determined that the media stream has been disrupted, by polling the clients and itself to determine the minimum bitrate (Rmin), and supplying the media stream at the minimum bitrate (Rmin) for a time equal to new minimum buffering capacity minus the current buffering capacity, divided by the minimum bitrate minus the first bitrate ((Cnew−Cc)/(Rmin−R1).

24. The system of claim 23 wherein the server includes a tracker to maintain a current_buffer_level measurement of the number of media packets being supplied by the server and a target_buffer_level measurement of the new minimum client buffering capacity; and,
  wherein the server modifies the supply of the media stream in response to the current_buffer_level and target_buffer_level measurements maintained by the tracker.

25. The system of claim 16 wherein the server communicates media stream modifications to the clients using real-time-streaming protocol (RTSP).

26. The system of claim 16 wherein the server supplies media stream data as media packets with a timestamp; and,
  wherein each client reorders out-of-order media packets, handles any lost media packets, and schedules the playout of the media packets at a uniform rate in response to the media type and the first bitrate (R1).

* * * * *

UNITED STATES PATENT AND TRADEMARK OFFICE
CERTIFICATE OF CORRECTION

PATENT NO. : 7,047,308 B2
APPLICATION NO. : 09/944012
DATED : May 16, 2006
INVENTOR(S) : Deshpande Page 1 of 2

It is certified that error appears in the above-identified patent and that said Letters Patent is hereby corrected as shown below:

On the Title Page, Item (54), and in the Specifications, Column 1, Line 2, in Title, delete "SIMULTANEOUS" and insert -- CONTROLLING --, therefor.

On the Title Page, Item (56), under "OTHER PUBLICATIONS", in Column 2, Line 4, delete "IEFT," and insert -- IETF, --, therefor.

On the Title Page, Item (57), under "ABSTRACT", in Column 2, Line 11, delete "dents," and insert -- clients, --, therefor.

On Title Page 2, Item (56), under "OTHER PUBLICATIONS", in Column 1, Line 2, delete "IEFT," and insert -- IETF, --, therefor.

In the Drawings

In Fig. 2, Sheet 1 of 8, delete "PACKETS RECIEVED" and insert -- PACKETS RECEIVED --, therefor.

In Fig. 9b, Sheet 4 of 8, delete "FROM Fig 9a" and insert -- FROM Fig. 9a --, therefor.

In Fig. 9a, Sheet 8 of 8, delete "TO Fig 9b" and insert -- TO Fig. 9b --, therefor.

In the Specifications

In Column 9, Lines 37-38, delete " $\frac{(Cnew - C1) - (R\min - R1)t}{(R\min - R1}$ ." and insert Signed and Sealed this
Eighteenth Day of March, 2014

Michelle K. Lee
*Deputy Director of the United States Patent and Trademark Office*

CERTIFICATE OF CORRECTION (continued)
U.S. Pat. No. 7,047,308 B2

-- $$\frac{(Cnew - C1) - (R\min - R1)t}{(R\min - R1)}$$ --, therefor.

In the Claims

In Column 14, Line 18, in Claim 12, delete "current_buffer_level" and insert -- current_buffer_level, --, therefor.

In Column 14, Line 30, in Claim 14, delete "comprising;" and insert -- comprising: --, therefor.

In Column 14, Line 34, in Claim 14, delete "target_buffer-level" and insert -- target_buffer_level, --, therefor.

In Column 14, Line 64, in Claim 16, delete "chance" and insert -- change --, therefor.

In Column 16, Line 9, in Claim 22, delete "current_buffer_level" and insert -- current_buffer_level, --, therefor.